United States Patent

Hamwi et al.

[11] Patent Number: 5,175,066
[45] Date of Patent: Dec. 29, 1992

[54] RECHARGEABLE BATTERY WITH SOLID ELECTROLYTE

[75] Inventors: André Hamwi, Clermont-Ferrand; Rachid Yazami, St. Nazaire les Eymes, both of France

[73] Assignee: Centre National de la Recherche Scientifique (CNRS), Paris, France

[21] Appl. No.: 690,984

[22] PCT Filed: Dec. 22, 1989

[86] PCT No.: PCT/FR89/00670
§ 371 Date: Jun. 25, 1991
§ 102(e) Date: Jun. 25, 1991

[87] PCT Pub. No.: WO90/07798
PCT Pub. Date: Jul. 12, 1990

[30] Foreign Application Priority Data
Dec. 26, 1988 [FR] France .................. 88 17172

[51] Int. Cl.⁵ .................. H01M 10/40; H01M 6/18
[52] U.S. Cl. .................. 429/192; 429/218
[58] Field of Search .................. 429/192, 218, 30, 33

[56] References Cited

U.S. PATENT DOCUMENTS

| 3,514,337 | 5/1970 | Braeuer et al. | 429/194 |
| 4,009,323 | 2/1977 | Bennion et al. | 429/194 |
| 4,201,839 | 5/1980 | Johnson et al. | 429/194 |

FOREIGN PATENT DOCUMENTS

| 0013199 | 7/1980 | European Pat. Off. |
| 83 09886 | 6/1983 | France |
| 2122413 | 1/1984 | United Kingdom |

OTHER PUBLICATIONS

Solid State Ionics, vol. 28-30, 1988, North-Holland Amsterdam, Yazami et al., "A New Graphite Fluoride Compound as Electrode Material for Lithium Interelation in Solid State Cells".

Extended Abstracts, 6th Int. Conf. SSI, 1987, Garmisch, R. Yazami et al.

Extended Abstracts of the International Conference on Materials with Exceptional Properties, Nov. 24-27, 1987, Bordeaux, France, M. Daoud et al.

Extended Abstracts of Lithium Batteries Conference, Vancouver, Canada, May 1988, "new Graphite Fluorides as Electrode Materials in Lithium Batteries", A. Hamwi et al.

Extended Abstracts of "Colloque International sur les Composés Lamellaires," Mar. 8-10, 1988, Pont-a-Mousson, France, New Graphite Fluorides Compounds and Their Applications as Electrodes in Lithium Cells System, A. Hamwi et al.

Patent Abstracts of Japan, JP 62 108 474, Matsushita Electric Ind. Co. Ltd., Oct. 13, 1987, vol. 11, No. 314.

Synthetic Metals, vol. 26, pp. 89-98, (1988), "Graphite Fluorides Prepared at Room Temperature 1, Synthesis and Characterization", A. Hamwi et al.

Primary Examiner—Anthony Skapars
Attorney, Agent, or Firm—Foley & Lardner

[57] ABSTRACT

The present invention relates to a rechargeable battery with solid electrolyte.

The battery according to the invention comprises a solid polymer electrolyte, an anode composed of a lithium source and a cathode comprising a lithium-receiving material. The lithium-receiving material is a compound of the formula $CF_xM_y$, where M is chosen from I, Cl, Br, Re, W, Mo, B and $0.3 \leq x \leq 0.9$, $0.02 \leq y \leq 0.06$, and the structure of this material is such that the carbon atoms form planar hexagons.

The battery according to the invention has improved capacity.

7 Claims, 5 Drawing Sheets

FIG. 5
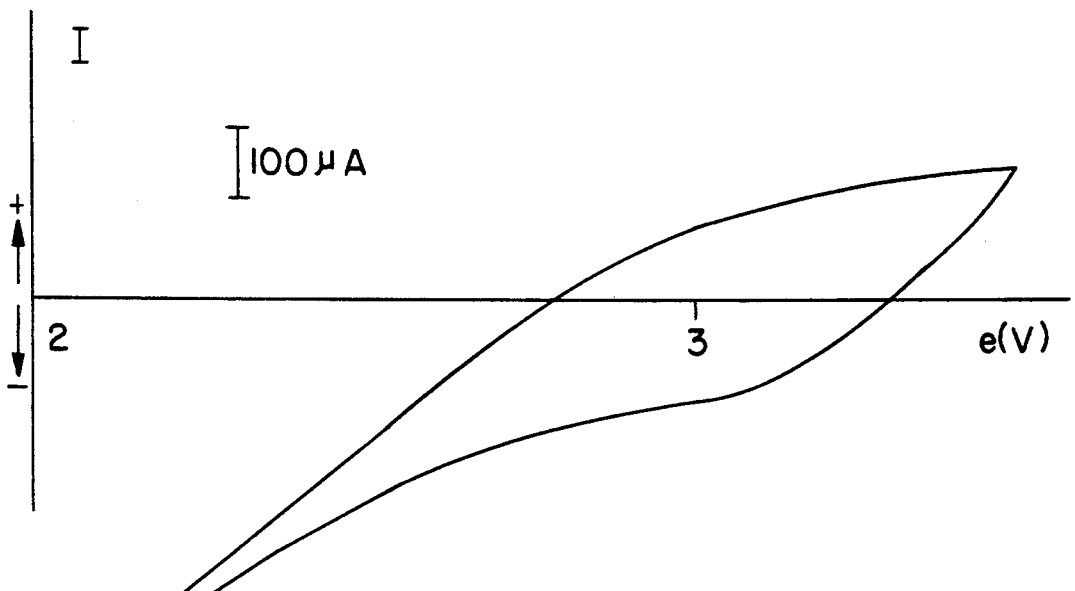
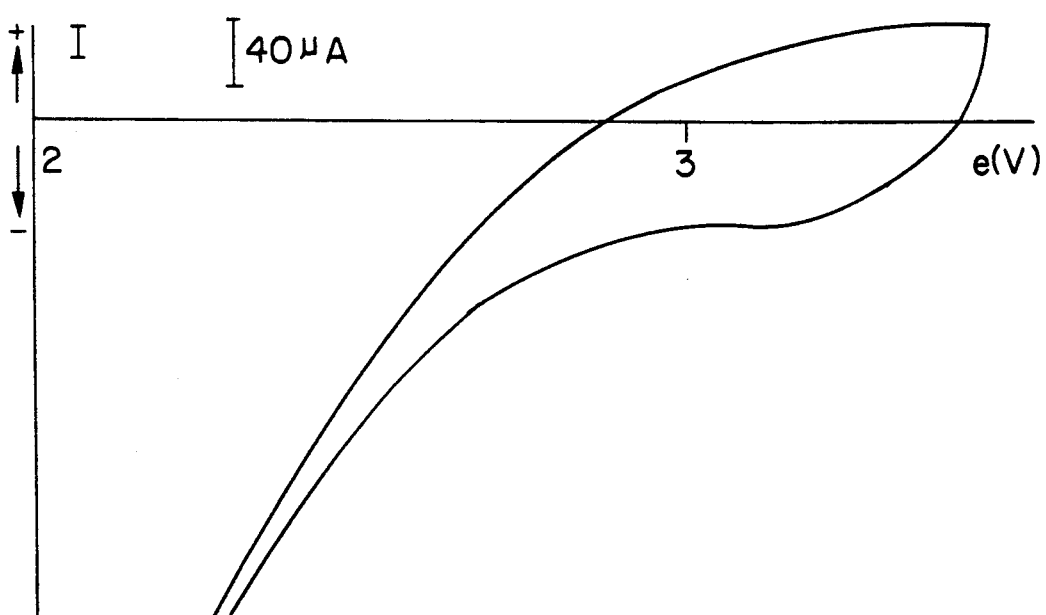
FIG. 6

RECHARGEABLE BATTERY WITH SOLID ELECTROLYTE

The present invention relates to a cathode material for a rechargeable battery with solid electrolyte and to the rechargeable batteries comprising said material as cathode material.

The development of batteries with solid electrolyte has constituted a significant progress in the area of rechargeable batteries. Lithium batteries with solid electrolyte are a particularly interesting class of rechargeable batteries. These batteries comprise two reversible lithium electrodes, one of which acts as a source of lithium ions during the discharge and the other as host of lithium ions, the two being separated by a thin film of polymer electrolyte which acts as a lithium ion support. The process is reversed during recharging.

In the know batteries, the lithium source can be a metallic lithium (or lithium alloy) sheet, a structure for intercalating lithium ions at low potential (for example $WO_2$) or a conjugated polymer n-doped with lithium. The host is generally a structure for intercalation lithium ions ($TiS_2$, $V_6O_{13}$, $MoO_2$, and the like), a transition metal compound which can be reduced by lithium (for example $FeS_2$, $NiS_2$) or a p-doped conjugated polymer. The lithium ion support is obtained by dissolving a lithium salt (for example $LiClO_4$, $LiCF_3SO_3$) in a solvating aprotic polymer, such as a polyethylene oxide.

Batteries of this type have favorable performance levels. Nevertheless, their capacity is insufficient. Thus, for a battery comprising $TiS_2$, the calculated capacity is in the order of 200 A.h/kg; for a battery comprising $V_6O_{13}$, it is in the order of 300 A.h/kg.

Furthermore, various compounds for intercalation lithium ions are known as cathode materials in nonrechargeable batteries.

Thus, lithium batteries with solid electrolyte are known in which the cathode material is a carbon fluoride $CF_x$ obtained by reaction of fluorine with graphite at a temperature in the order of 350 to 650° C. Such a cathode material is suitable for batteries. However, the reversibility of intercalation of lithium ions in such a material is virtually zero and it cannot be used in rechargeable batteries.

In addition, the use of carbon fluorides obtained at ambient temperature as cathode material has been described, on the one hand, in batteries with solid polymer electrolyte, and, on the other, in an electrochemical system with liquid electrolyte (propylene carbonate). The reversibility of intercalation of the lithium ions in the liquid system has been found to be very poor. The C-F bond of the graphite fluorides obtained at low temperature indeed has a partial ionic character, which facilitates the formation of LiF between the graphite planes upon discharge according to the scheme $Li^+ + F^-F \rightarrow LiF$. During discharge, the dissociation reaction $LiF \rightarrow Li^+ + F^-$ should take place. In theory, this reaction is difficult to imagine, since the enthalpy is very strongly positive.

Indeed, LiF is formed which precipitates. The solvent contributes to entraining LiF formed at the outside of the electrochemically active zones, especially outside the electrolyte, by dissolution and nucleation.

The present inventors have now found that, contrary to the liquid systems, the electrochemical systems with solid electrolyte gave good reversibility of intercalation of lithium ions in a material composed of a graphite fluoride obtained at ambient temperature and they have developed a new rechargeable battery with solid electrolyte.

The present invention relates to a rechargeable battery comprising a solid polymer electrolyte, an anode composed of a lithium source and a cathode comprising a lithium-receiving material, characterized in that the lithium-receiving material is a compound of the formula $CF_xM_y$ where M is chosen from I, Cl, Br, Re, W, Mo, B and $0.3 \leq x \leq 0.9$, $0.02 \leq y \leq 0.06$, and the structure of this material is such that the carbon atoms form planar hexagons.

BRIEF DESCRIPTION OF THE DRAWINGS

FIGS. 5, 6, 7 and 8 shown cyclovoltammograms with different sweep rates and a (CF)n mass equivalent to 1.5 times mass of fluoride used in example 1.

Figure 1:
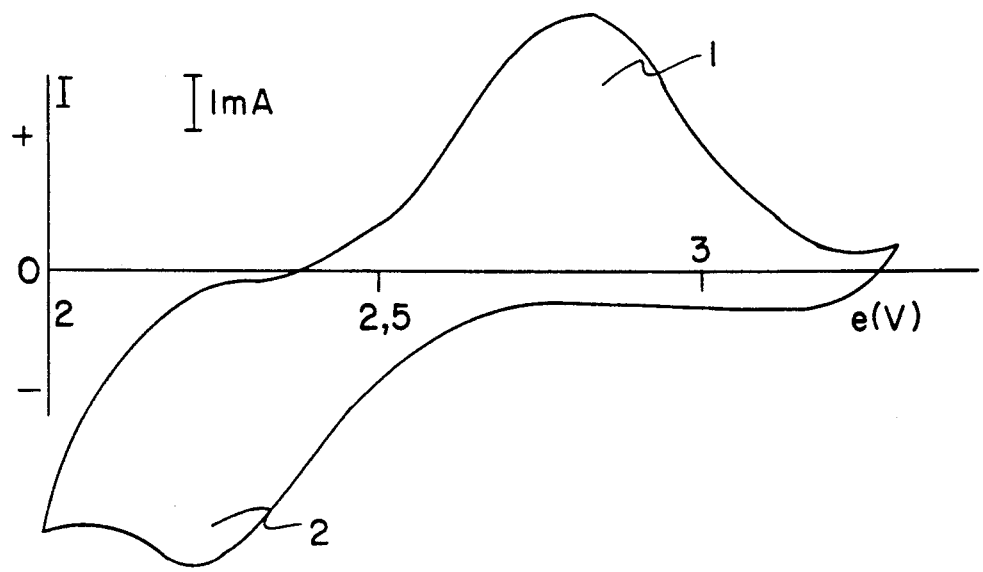
FIGS. 1, 2, 3 and 4 confirm reversibility of the system with different sweep rates.
Figure 2:
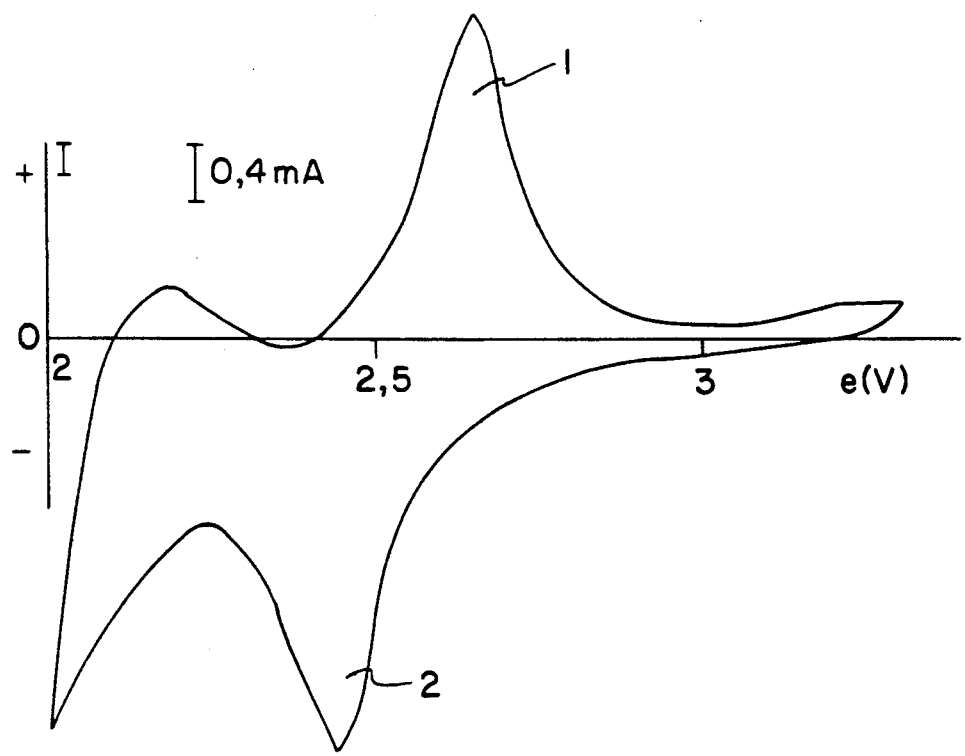
Figure 3:
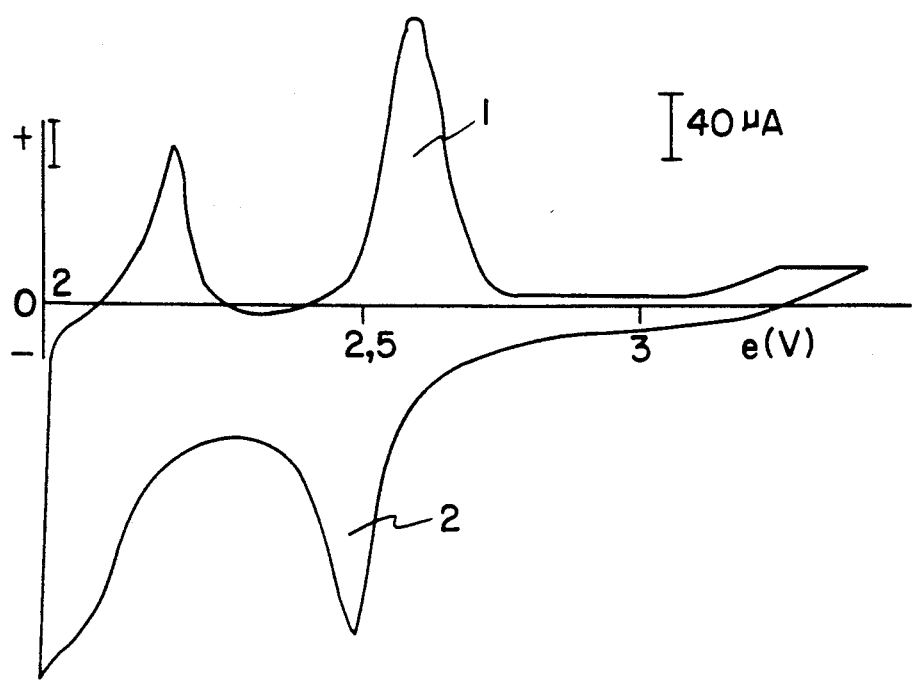
Figure 4:
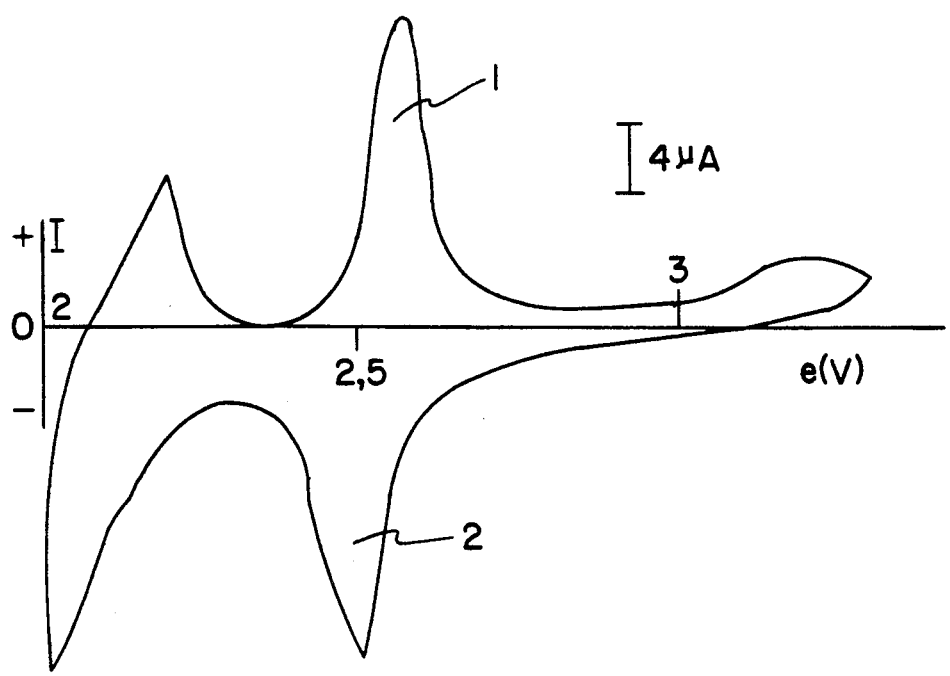
Figure 7:
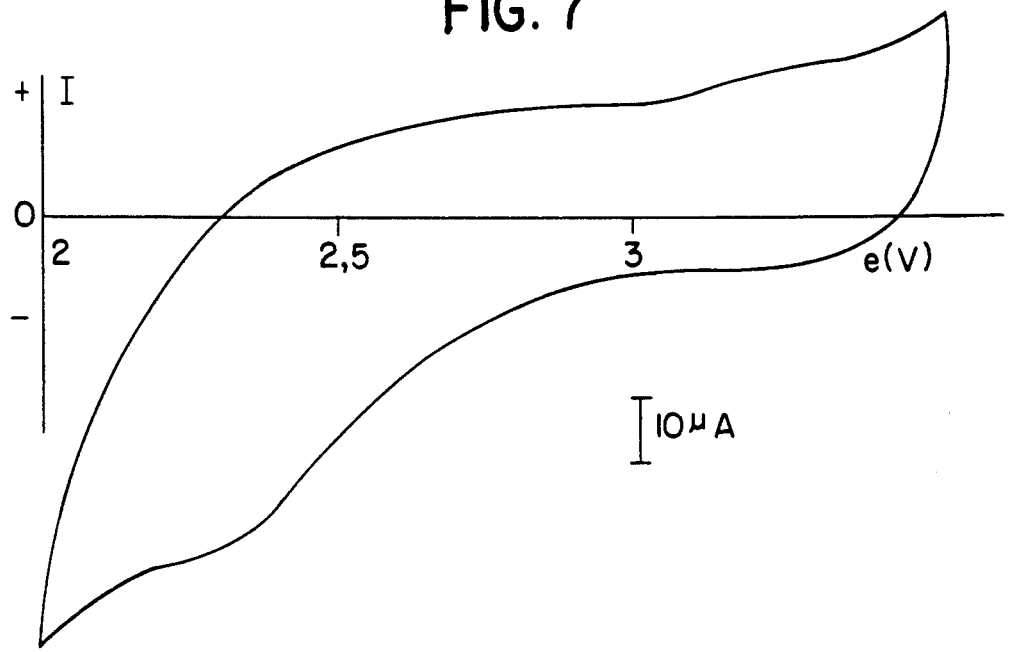

The compounds which can be used as receiving materials are obtained at ambient temperature by reaction of graphite with gaseous fluorine $F_2$ in the presence of an $HF + MF_n$ mixture as catalyst (n representing the valence of the element M). The catalyst reduces the energy barrier for forming C-F bonds.

Suitable $MF_n$ compounds which can be used in the present invention are $IF_7$, $IF_5$, $ClF_3$, $BrF_5$, $BF_3$, $ReF_6$, $ReF_7$, $WF_6$ and $MoF_6$.

Particularly preferred compounds are $IF_7$, $IF_5$, $ClF_3$, $BrF_5$, $BF_3$ and $ReF_7$. Of these, $IF_7$ and $IF_5$ give the highest fluorine content in the compound $CF_xM_y$.

The synthesis of the compounds $CF_xM_y$, such as are defined above, at ambient temperature is described especially in Synthetic Metals, Vol. 26 (1988) p. 89 (A. Hamwi, M. Daoud, J. C. Cousseins).

The electrolyte used in the battery according to the invention is a solid polymer electrolyte. Examples of solid polymers which can be used are chemically inert compounds, such as are described especially in European Patent No. 13,199 and the French patent filed on Jun. 15, 1983 under No. 8,309,886. Polyethers are particularly suitable.

A particularly advantageous material is polyethylene oxide containing a lithium salt, for example $LiClO_4$ or $LiCF_3SO_3$. A suitable example is $P(OE)_8LiClO_4$.

In a particularly preferred variant of the battery according to the invention, the cathode is composed of a composite material comprising, in addition to the compound receiving lithium ions $CF_xM_y$, the material constituting the electrolyte.

As anode material, use can be made of the materials which are conventionally used in lithium batteries. Of these, metallic lithium or a lithium alloy, the compounds for intercalating lithium at a low potential, especially $WO_2$, or a conjugated polymer n-doped with lithium, may be mentioned.

The present invention will be described in more detail in the non-limiting examples given below by way of illustration and in the comparative examples.

Preparation of the cathode materials 2 g of finely powdered natural madagascar graphite (grain size: 10 μm) were dehydrated under a low vacuum at 500° C. They were then introduced into a tubular Monel reactor.

$MF_n$ was then prepared by direct fluorination of the element M or a salt of M. A permanent flow of an $F_2$ +HF mixture was maintained in the reactor for several hours at ambient temperature.

The carbon fluoride was doped with Cl or Br by using salts, of which KBr, KCl, NaBr and NaCl may be mentioned. In the other cases, the element M itself, for example $I_2$, W or Mo, was used.

The composition of the products obtained was determined by elemental analysis. A hydrogen content of less than 0.01% was detected, which proves that HF effectively acts as a catalyst.

This gave the samples A to D.

In the preceding examples for preparing $CF_xM_y$, madagascar graphite was used. Graphite of different origin, for example, ceylon graphite, can be used. It is also possible to use coke. The graphite was dehydrated under a low vacuum. This operation is, however, indispensable only in the presence of oxygen, in order to avoid oxidation of the substances present.

Table 1 shows the composition of the products $CF_xM_y$ obtained as a function of the starting material $MF_n$.

TABLE 1

| Sample | $MF_n$ | $CF_xM_y$ |
|---|---|---|
| A | $IF_5$ | $CF_{0.80}I_{0.02}$ |
| B | $ClF_3$ | $CF_{0.65}Cl_{0.05}$ |
| C | $BrF_5$ | $CF_{0.62}Br_{0.05}$ |
| D | $BF_3$ | $CF_{0.52}B_{0.06}$ |

EXAMPLE 1

A battery was built according to the following schemes

Li / $P(OE)_8 \cdot LiClO_4$ / $CF_{0.80}I_{0.02}$ by means of material A. The battery consists of a high-purity lithium disk having a thickness of about 0.5 mm and a diameter of about 17 mm. This lithium disk was pressed onto a stainless steel disk of the same diameter, which constitutes the electron collector. The thin-film cathode was obtained by spreading a composite suspension comprising $CF_{0.80}I_{0.02}$, graphite and PEO (polyethylene oxide) in acetonitrile on a stainless steel disk of 20 mm diameter.

The cathode was then dried at ambient temperature under argon, then at 80° C. under a vacuum for several hours. The composition by volume of the cathode was approximately 40% of $CF_{0.80}I_{0.02}$, 10% of graphite, 50% of $P(OE)_8 \cdot LiClO_4$. Its weight was about 10 mg.

A solid $P(OE)_8 LiClO_4$ electrolyte film having a of about 100 μm and a diameter of 21 mm was pressed between the lithium disk (anode) and the cathode. The whole was sealed in a glove box under an argon atmosphere with an $H_2O + O_2$ content of less than 2 vpm.

The reversibility of the system was confirmed by carrying out cyclovoltammograms at 80° C. with different sweep rates shown in FIGS. 1 to 4. In these FIGS. 1, 2, 3 and 4, the sweep rate was 1 V/min, 100 mV/min, 10 mV/min and 1 mV/min respectively. For the curves, the current intensity (in A) is plotted on the ordinate and the voltage (in volts) of the Li—Li+ system on the abscissa. The scales for the current intensities are shown in the figures.

The peaks corresponding to the oxidation, which are marked (1), have a surface area in the same order of magnitude as the peaks corresponding to the reduction, which are marked (2). This phenomenon is an indication of the cyclical nature of the electrochemical system.

EXAMPLE 2

A battery was built according to the following scheme:

Li / $P(OE)_8 \cdot LiClO_4$ / $CF_{0.5}B_{0.06}$ by means of the material in accordance with sample D. The structure of the battery is identical to that of Example 1.

The theoretical capacity of such an electrochemical system is 620 A.h/kg.

The capacity measured with the battery obtained varies between 400 and 600 A.h/kg.

EXAMPLE 3

A battery corresponding to the scheme

Li / $P(OE)_8 \cdot LiClO_4$ / $CF_{0.7}W_{0.06}$ was built in accordance with the procedure of Example 1.

The theoretical capacity of such a system is 620 A.h/kg and the capacity measured is in the order of 460 A.h/kg.

Consequently, it appears that the capacity measured for the batteries according to the invention is markedly higher than the theoretical capacity of the prior art batteries.

COMPARATIVE EXAMPLE 1

An electrochemical cell was built in the same manner as in Example 1 according to the following scheme Li / $P(OE)_8 \cdot LiClO_4$ / $(CF)_n$.

$(CF)_n$ is a graphite fluoride obtained at elevated temperature (350–650° C.) and having essentially covalent C–F bonds.

The cyclovoltammograms carried out at 80° C. with different sweep rates and a $(CF)_n$ mass equivalent to 1.5 times the mass of fluoride used in Example 1 are shown in FIGS. 5, 6, 7 and 8. In these figures, the voltage (in volts) is plotted on the abscissa and the current intensity (in A) on the ordinate. The scales for the current intensities are shown in the figures.

In the experiments carried out for each of the figures, the sweep rates were 1 V/min, 100 mV/min, 10 mV/min and 1 mV/min respectively.

Figure 8:
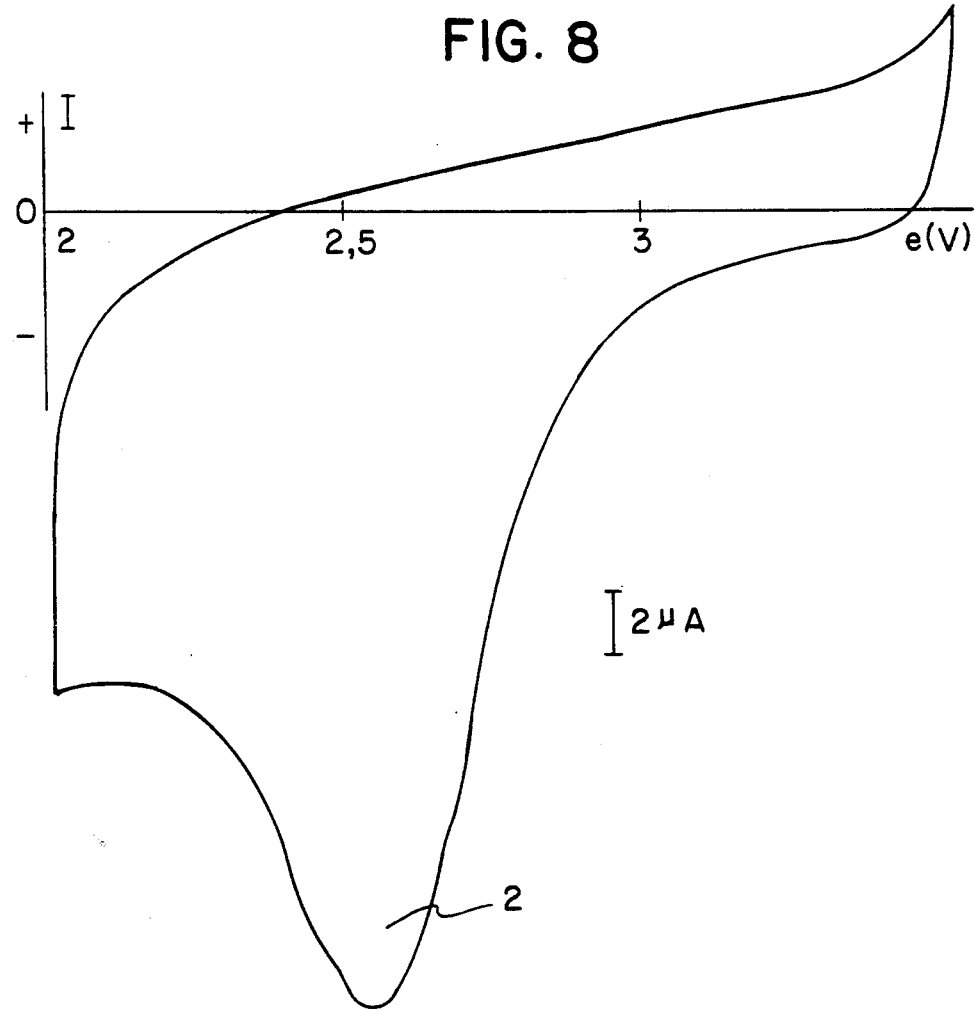

Only a very low sweep rate causes a reduction peak (2) to appear (cf. FIG. 8). Consequently, discharge takes place with a variable potential, except when the sweep rate is very low. It should be noted that no oxidation peak ever appears. The system can therefore not constitute a rechargeable battery.

COMPARATIVE EXAMPLE 2

A liquid electrochemical cell corresponding to the scheme Li / PC · $LiClO_4$ / $CF_{0.75}I_{0.03}$ (sic) is built.

$CF_{0.75}I_{0.03}$ is a graphite fluoride obtained at ambient temperature in the same manner as samples A to D with HF + $IF_5$ as catalyst.

Figure 9:
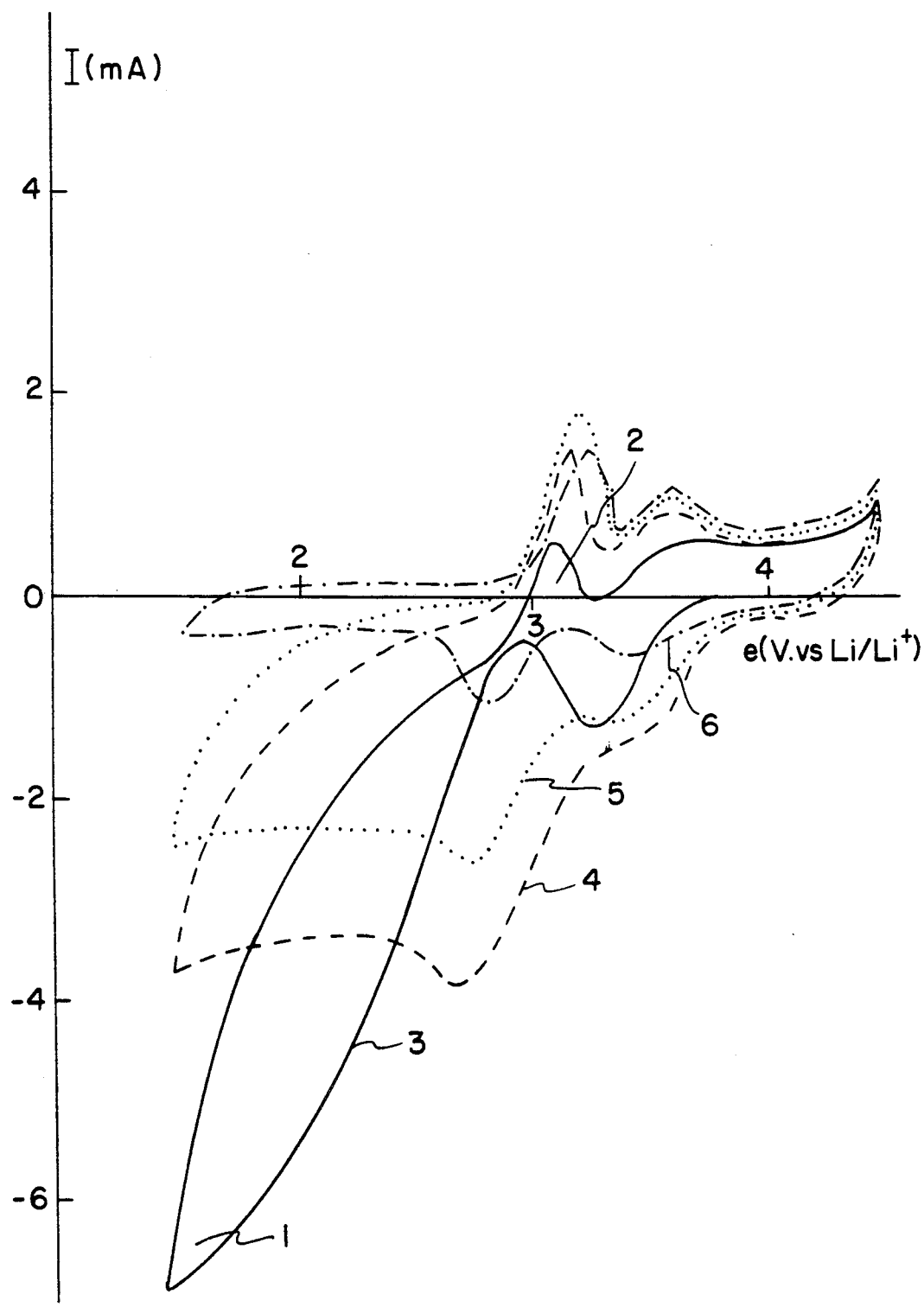
FIG. 9 shown cyclovoltammogram.

The cyclovoltammogram is shown in FIG. 9. In this figure, the voltage (in volts) is plotted on the abscissa and the current intensity (in mA) on the ordinate. (3) shows the first cycle, (4) the second, (5) the third and (6) the twelfth. It can be seen that the cycles are not superimposable. Furthermore, in the first cycles, the peak (2) corresponding to the reduction is very clearly disproportionate with respect to the peak (1) which corresponds to the oxidation.

Consequently, such a system cannot be used to form a rechargeable battery.

In contrast to the electrochemical systems in which a graphite fluoride obtained at elevated temperature is associated with a solid polymer electrolyte or a graphite fluoride obtained at ambient temperature is associated with a liquid electrolyte, the electrochemical lithium systems in which a solid polymer electrolyte and a cathode material composed of a graphite fluoride obtained at ambient temperature are associated constitute rechargeable batteries having good performance levels.

I claim:

1. Rechargeable battery comprising a polymer electrolyte, an anode composed of a lithium source and a cathode comprising a lithium-receiving material, characterized in that the lithium-receiving material is a compound of the formula $CF_xM_y$, where M is chosen from I, Cl, Br, Re, W, Mo, B and $0.3 \leq x \leq 0.9$, $0.02 \leq y \leq 0.06$, and the structure of this material is such that the carbon atoms form planar hexagons, said compound of the formula $CF_xM_y$ being obtained at ambient temperature by reaction of graphite with gaseous fluorine $F_2$ in the presence of an HF + $MF_n$ mixture as catalyst, representing the valence of the element M.

2. Rechargeable battery according to claim 1 (sic), characterized in that $MF_n$ is chosen from $IF_7$, $IF_5$, $ClF_3$, $BrF_5$, $BF_3$ and $ReF_7$.

3. Rechargeable battery according to claim 1, characterized in that the lithium source of the anode is composed of metallic lithium or a lithium alloy, a compound for intercalating lithium at a low potential or a conjugated polymer n-doped with lithium.

4. Rechargeable battery according to claim 1, characterized in that the electrolyte is composed of a chemically inert polyether and a lithium salt.

5. Rechargeable battery according to claim 4, characterized in that the electrolyte is composed of polyethylene oxide and lithium perchlorate.

6. Rechargeable battery according to claim 1, characterized in that the cathode material comprises, in addition to the lithium receiver, the material constituting the solid polymer electrolyte.

7. Rechargeable battery according to claim 1, characterized in that the cathode material comprises graphite.

* * * * *